(12) United States Patent
Kakkar et al.

(10) Patent No.: US 10,171,308 B2
(45) Date of Patent: Jan. 1, 2019

(54) DYNAMIC CABLE-LINKAGE MANAGEMENT

(71) Applicant: International Business Machines Corporation, Armonk, NY (US)

(72) Inventors: Gaurav Kakkar, Bangalore (IN); Santosh S. Puranik, Bangalore (IN); Jinu J. Thomas, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 15/242,507

(22) Filed: Aug. 20, 2016

(65) Prior Publication Data

US 2018/0054362 A1 Feb. 22, 2018

(51) Int. Cl.
*H04L 12/24* (2006.01)
*H04L 12/911* (2013.01)

(52) U.S. Cl.
CPC .............. *H04L 41/12* (2013.01); *H04L 47/70* (2013.01)

(58) Field of Classification Search
CPC .......... H04L 41/12; H04L 47/70; H04L 67/16
See application file for complete search history.

(56) References Cited

U.S. PATENT DOCUMENTS

| | | | | |
|---|---|---|---|---|
| 7,602,728 B2* | 10/2009 | Adhikari | ................ | H04L 41/12 370/248 |
| 7,961,638 B2* | 6/2011 | Porat | .................. | H04L 41/0803 370/252 |
| 7,978,719 B2 | 7/2011 | Ramanan et al. | | |
| 2002/0097730 A1* | 7/2002 | Langille | ............. | H04L 12/4641 370/401 |
| 2003/0063571 A1* | 4/2003 | Ikeda | ...................... | H04L 41/12 370/254 |
| 2004/0193706 A1* | 9/2004 | Willoughby | .......... | G06F 15/177 709/223 |
| 2006/0280125 A1* | 12/2006 | Rannanan | ........ | H04L 29/12254 370/252 |
| 2007/0121507 A1* | 5/2007 | Manzalini | .............. | H04L 47/10 370/235 |
| 2009/0290513 A1* | 11/2009 | Swan | .................. | H04L 41/0213 370/255 |
| 2012/0120803 A1* | 5/2012 | Farkas | ................ | H04L 12/4625 370/235 |
| 2013/0132607 A1* | 5/2013 | Sinha | ...................... | H04L 45/00 709/238 |
| 2014/0160982 A1* | 6/2014 | Imai | ...................... | H04L 41/145 370/254 |

(Continued)

*Primary Examiner* — Alina A Boutah
(74) *Attorney, Agent, or Firm* — Tihon Poltavets

(57) ABSTRACT

Disclosed aspects relate to dynamic cable-linkage management for a shared pool of configurable computing resources having a set of cable-linkage topology data. A first connection between a first service processor and a plurality of compute nodes may be sensed by a first mapping engine which is coupled with a first service processor on a set of control nodes. A plurality of node identifiers may be established on the plurality of compute nodes by the first mapping engine. Based on the plurality of node identifiers and the set of cable-linkage topology data, a first device path map may be determined. A set of data traffic may be routed via the first connection between the first service processor and the plurality of compute nodes based on the first device path map.

17 Claims, 5 Drawing Sheets

(56) References Cited

U.S. PATENT DOCUMENTS

| | | | | |
|---|---|---|---|---|
| 2014/0372662 A1* | 12/2014 | Evans | ................. | G06F 13/4022 |
| | | | | 710/316 |
| 2015/0178173 A1 | 6/2015 | Brodsky et al. | | |
| 2015/0222545 A1* | 8/2015 | Sarkar | ................... | H04L 45/122 |
| | | | | 370/238 |
| 2015/0244464 A1* | 8/2015 | Maggiari | .............. | H04J 3/1652 |
| | | | | 398/68 |
| 2018/0034704 A1* | 2/2018 | Kakkar | ................... | H04L 41/12 |

\* cited by examiner

DYNAMIC CABLE-LINKAGE MANAGEMENT

BACKGROUND

This disclosure relates generally to computer systems and, more particularly, relates to dynamic cable-linkage management for a shared pool of configurable computing resources having a set of cable-linkage topology data. Cable-linkage management may be desired to be performed as efficiently as possible. The number of hardware components in server systems that need to be managed by enterprises is increasing. As the number of hardware components in servers systems continues to increase, the need for efficient management of cable links for those hardware components may increase.

SUMMARY

Aspects of the disclosure relate to dynamic cabling in multi-node server environments using dynamic node position assignment techniques. Dynamic device path mapping of compute nodes by a service processor may maintain data redundancy between multiple service processors of the server environment without the need for additional hardware to validate the cable topology. A first control node may use a set of cable linkage topology data to assign identifiers to compute nodes of the server environment. The first control node may store data regarding the compute nodes and assigned identifiers to a persistent location such that a second control node may access the persistent location and read the compute node/identifier data. Based on the compute node and associated identifier data, the second control node may modify device paths to route device link data traffic to corresponding compute nodes. Leveraging dynamic cable-linkage techniques may facilitate efficient management of service processors and other hardware components of multi-node server environments.

Disclosed aspects relate to dynamic cable-linkage management for a shared pool of configurable computing resources having a set of cable-linkage topology data. A first connection between a first service processor and a plurality of compute nodes may be sensed by a first mapping engine which is coupled with a first service processor on a set of control nodes. A plurality of node identifiers may be established on the plurality of compute nodes by the first mapping engine. Based on the plurality of node identifiers and the set of cable-linkage topology data, a first device path map may be determined. A set of data traffic may be routed via the first connection between the first service processor and the plurality of compute nodes based on the first device path map.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
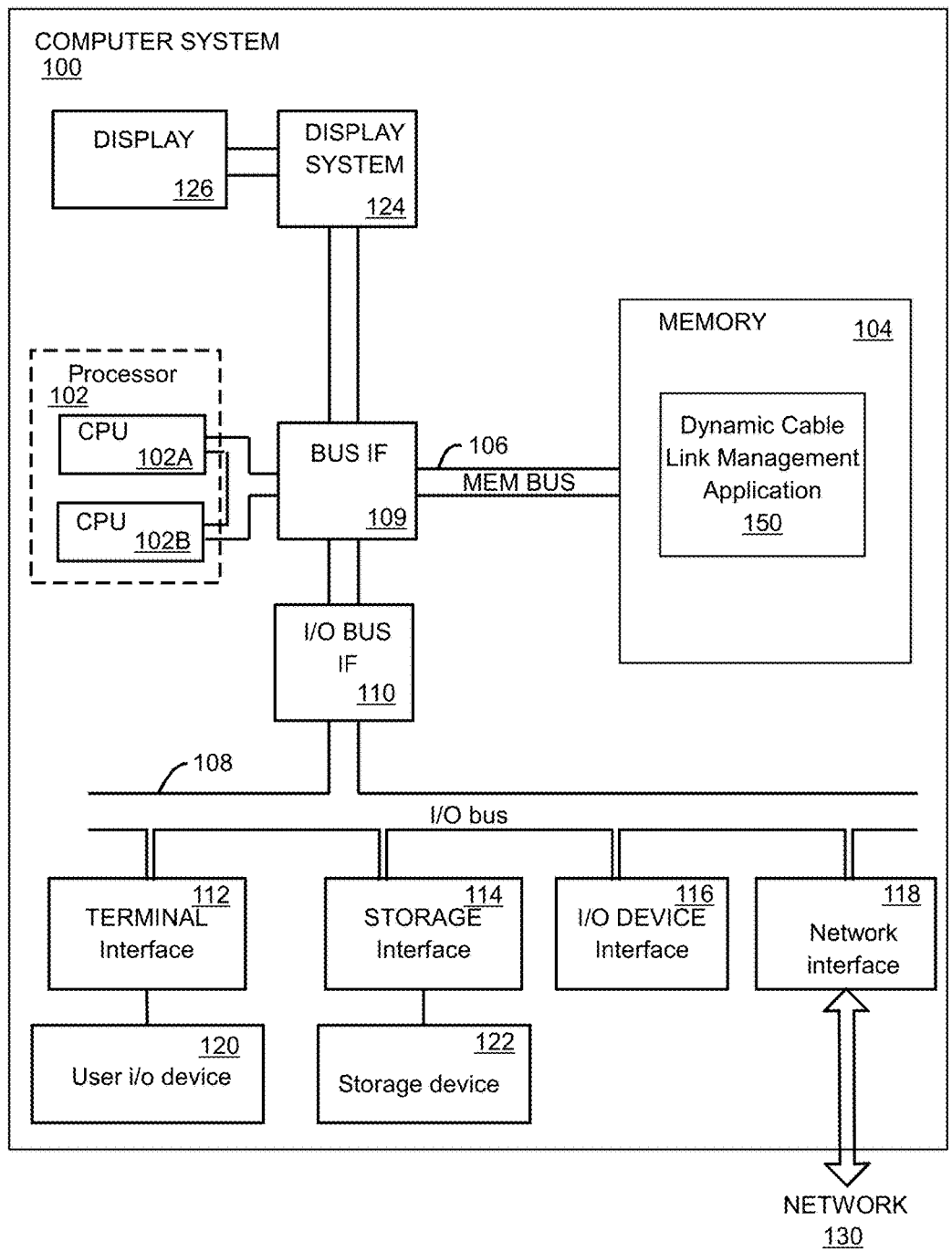
FIG. 1 depicts a high-level block diagram of a computer system for implementing various embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to dynamic cabling in multi-node server environments using dynamic node position assignment techniques. Dynamic device path mapping of compute nodes (e.g., Central Electronics Complex Drawers) by a service processor may maintain data redundancy between multiple service processors of the server environment without the need for additional hardware to validate the cable topology. A first control node (e.g., service processor) may use a set of cable linkage topology data (e.g., indicating compute nodes and corresponding device link ranges) to assign identifiers to compute nodes of the server environment. The first control node may store data regarding the compute nodes and assigned identifiers to a persistent location (e.g., shared-access memory device of a compute node) such that a second control node may access the persistent location and read the compute node/identifier data. Based on the compute node and associated identifier data, the second control node may modify device paths to route device link data traffic to corresponding compute nodes. Leveraging dynamic cable-linkage techniques may facilitate efficient management of service processors and other hardware components of multi-node server environments.

As the complexity of server systems continues to increase, maintaining stable communication connections between service processors, compute nodes, and other hardware devices of a network environment is one important aspect of service interface topology management. Server systems often include a primary service processor and one or more secondary service processors located on one or more control nodes to facilitate data traffic transmission between compute nodes and other hardware components. Data redundancy may be maintained between the primary and secondary service processors in order to promote data security and reduce the impact of an error event with respect to one of the service processors. Aspects of the disclosure relate to the recognition that, in some situations, maintaining data redundancy may require identical cable topology between the primary and secondary service processors, requiring additional network hardware for cable validation and time and effort for cable correction in the event of a misconnected cable. Accordingly, aspects of the disclosure relate to dynamic node position assignment such that the primary service processor may establish node identifiers for one or more component nodes based on corresponding field-replaceable-unit service interface (FSI) links and save the node identifier information in a persistent location. As such, secondary service processors may access the node identifier information and route FSI device traffic in accordance with the cable topology of the primary service processor (e.g., such that device traffic is routed to the corresponding node regardless of the physical cable topology). Aspects of the disclosure may be associated with server system reliability, redundancy, network flexibility, and a reduced need for cable topography verification hardware.

Aspects of the disclosure include a method, system, and computer program product for dynamic cable-linkage management for a shared pool of configurable computing resources having a set of cable-linkage typology data. In embodiments, the dynamic cable-linkage management may automatically introduce a device path between one or more service processors and one or more compute nodes. Aspects of the disclosure relate to sensing a first connection between the first service processor and a plurality of compute nodes. The first connection may be sensed by a first mapping engine which is coupled with the first service processor on a set of control nodes. The first mapping engine may establish a plurality of node identifiers on the plurality of compute nodes. In embodiments, establishing the plurality of node identifiers on the plurality of compute nodes may include writing the plurality of node identifiers into a persistent location and configuring the persistent location for access by the second mapping engine. In embodiments, an error event may be detected with respect to the first service processor, and the persistent location may be accessed by the second mapping engine. Aspects of the disclosure relate to determining a first device path map based on the plurality of node identifiers and the set of cable-linkage topology data. Based on the first device path map, a set of data traffic may be routed between the first service processor and the plurality of compute nodes via the first connection.

Aspects of the disclosure relate to sensing a second connection between the second service processor and the plurality of compute nodes. The second connection may be sensed by a second mapping engine which is coupled with a second service processor on the set of control nodes. In embodiments, the second connection may be sensed in response to sensing a disconnection between the first service processor and the plurality of compute nodes. In embodiments, an error event may be detected with respect to the service processor. Aspects of the disclosure relate to accessing the plurality of node identifiers on the plurality of compute nodes. The plurality of node identifiers may be accessed by the second mapping engine. In embodiments, the first and second mapping engines may be the same mapping engine. In embodiments, the second mapping engine may establish a batch of node identifiers on the plurality of compute nodes. Aspects of the disclosure relate to determining a second device path map based on the plurality of node identifiers and the set of cable-linkage topology data. Based on the second device path map, the set of data traffic may be routed between the second service processor and the plurality of compute nodes via the second connection. As described herein, dynamic cable-linkage management may be associated with performance or efficiency benefits (e.g., data security, application stability, speed, flexibility, load balancing, responsiveness, resource usage, productivity). Aspects may save resources such as bandwidth, processing, or memory.

Turning now to the figures, FIG. 1 depicts a high-level block diagram of a computer system for implementing various embodiments of the present disclosure, consistent with various embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a dynamic cable link management application 150. In embodiments, the dynamic cable link management application 150 may include instructions or statements that execute on the processor 102 or instructions or statements that are interpreted by instructions or statements that execute on the processor 102 to carry out the functions as further described below. In certain embodiments, the dynamic cable link management application 150 is implemented in hardware via semiconductor devices, chips, logical gates, circuits, circuit cards, and/or other physical hardware devices in lieu of, or in addition to, a processor-based system. In embodiments, the dynamic cable link management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 depicts several major components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
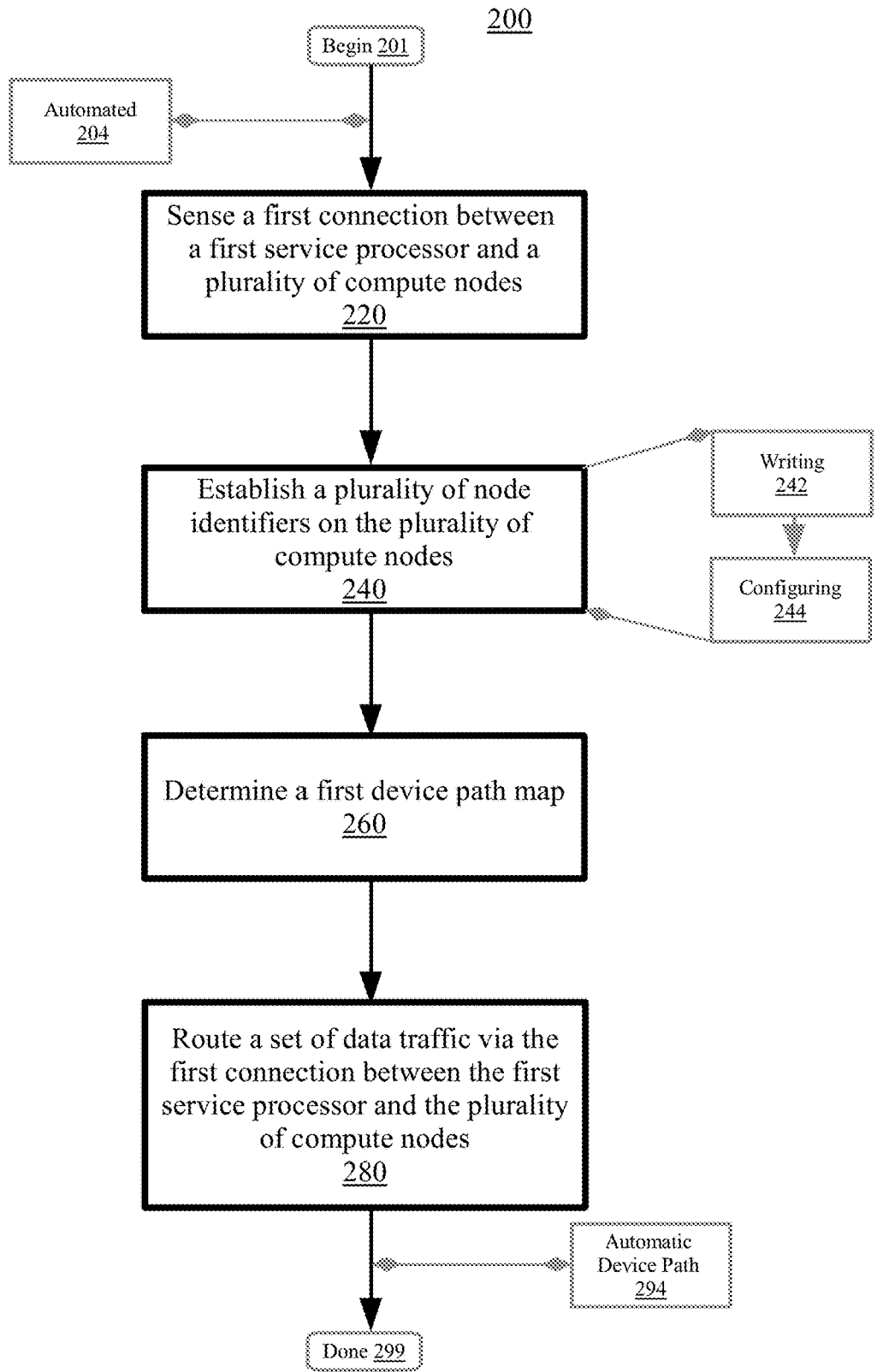
FIG. 2 is a flowchart illustrating a method for dynamic cable link management for a shared pool of configurable computing resources having a set of cable-linkage topology data, according to embodiments.

FIG. 2 is a flowchart illustrating a method 200 for dynamic cable link management for a shared pool of configurable computing resources having a set of cable-linkage topology data, according to embodiments. Cable linkage topology data may include information regarding the arrangement of various elements (e.g., links, nodes) of a computer network, including service processors, dual inline memory modules (DIMMS), server systems, other hardware and software components, and how they interface with one another (e.g., manage data traffic, error events). In embodiments, the cable linkage topology data may include information indicating which field-replaceable service interface (FSI) links correspond to which compute nodes of the network environment. In embodiments, the shared pool of configurable computing resources may include one or more service processors that make use of field-replaceable service interface (FSI) cables to transfer data traffic between nodes (e.g., compute nodes, control nodes) of the network environment. Accordingly, aspects of method 200 relate to using dynamic node position assignment techniques to facilitate management of a set of data traffic (e.g., from a set of hardware devices) with respect to a set of compute nodes. Leveraging dynamic node position assignment techniques may facilitate cable management, network flexibility, and data redundancy for the network environment. The method 200 may begin at block 201.

In certain embodiments, the sensing, the establishing, the determining, the routing, and other steps described herein may each occur in an automated fashion without user intervention at block 204. In embodiments, the sensing, the establishing, the determining, the routing, and other steps described herein may be carried out by an internal dynamic cable link management module maintained in a persistent storage device of a computing node that also includes one or more service processors. In certain embodiments, the steps described herein may be carried out by an external dynamic cable link management module hosted by a remote computing device or server (e.g., accessible via a subscription, usage-based, or other service model).

At block 220, a first connection between the first service processor and a plurality of compute nodes may be sensed. The first connection may be sensed by a first mapping engine which is coupled with a first service processor on a set of control nodes. The first mapping engine may include a hardware component or software module configured to perform dynamic node position assignment for the compute nodes of a network as well as other tasks to facilitate operation of one or more service processors (e.g., data traffic routing, error event management). Generally, sensing can include recognizing, detecting, discovering, discerning, or otherwise identifying the first connection between the first service processor and a plurality of compute nodes. The first connection may include a physical connection (e.g., hard-wired cable connection) wireless connection (e.g., local wireless, Bluetooth, near-field communication) or other link for enabling communication and data transfer between the first service processor and the plurality of compute nodes. In embodiments, sensing may include utilizing a device management tool to examine the hardware connections of the first service processor and identifying that the first service processor is communicatively connected with the plurality of compute nodes. In embodiments, sensing the first connection may include accessing a central network node that maintains schematic layouts of the physical and logical topologies of the network, and ascertaining that a connection exists between the first service processor and the set of compute nodes. Other methods of sensing the first connection are also possible.

In embodiments, as described herein, aspects of the disclosure relate to dynamic cable management for a network environment having a set of control nodes and a plurality of compute nodes. The set of control nodes may include data communication equipment (e.g., modems, hubs, switches) or data terminal equipment (e.g., host computer devices, routers, workstations, servers) configured to manage data transmission, power control, and other operations for devices of the network environment. In embodiments, the set of control nodes may include one or more service processors. Generally, a service processor can include a specialized processor that monitors the operational state of a set of hardware devices using sensors, and provides remote management capabilities including console redirection, logging, and power control. Aspects of the disclosure relate to a control node that hosts a first (e.g., primary) service processor and a second (e.g., redundant) service processor for facilitating dynamic cable management. The set of control nodes may be connected to a set of compute nodes. The set of compute nodes may include computing devices such as server systems, desktop/laptop computers, virtual machines, processor nodes, mobile devices (e.g., tablets, smartphones), Central Electronics Complex (CEC) nodes and other types of computer hardware. In embodiments, the set of control nodes may manage a set of connections configured to carry FSI links from a set of hardware devices of the network environment (e.g., storage devices, temperature sensors, fan controllers, memory devices, circuit boards, field-replaceable units, and other hardware components) to the compute nodes. Other types of control nodes and compute nodes are also possible.

Consider the following example. In embodiments, the first mapping engine may be configured to continuously monitor for changes to the physical or logical topology of the network environment. Modifications to existing network connections, new network connections, device introductions/disconnections, and other changes to the topology of the network environment may be registered in a central topology database maintained by the first mapping engine. In embodiments, the first mapping engine may monitor the registrations to the central topology database to identify changes made with respect to the first service processor and the plurality of compute nodes. In response to detecting a link (e.g., physical cable connection, network device wireless connection) between the first service processor and the plurality of compute nodes, the first mapping engine may sense the first connection. As an example, the first connection may include four service cables configured to carry FSI links between the first service processor and four separate compute nodes, with one service cable running between the first service processor and each individual compute node. Other methods of sensing the first connection are also possible.

At block 240, a plurality of node identifiers may be established on the plurality of compute nodes. The plurality of node identifiers may be established by the first mapping engine. Generally, establishing can include assigning, labeling, providing, designating, or otherwise specifying the plurality of node identifiers for the plurality of compute nodes. In embodiments, the plurality of node identifiers may include numbers, letters, symbols, characters, or other indications of how (e.g., the manner in which) the first service processor is connected to the plurality of compute nodes. The node identifiers may indicate which service interface cables of the first service processor are connected to which compute node (e.g., cable 3 to port 3 of node 2), which FSI links correspond to which compute nodes (e.g., links 2-8 on node 1), and other data regarding the configuration (e.g., physical and logical topology) of the connection between the first service processor and the plurality of compute nodes. In embodiments, establishing the node identifiers may include assigning a virtual number to each compute node of the set of compute nodes that indicates a set of corresponding FSI links. For example, a node identifier of "Node 1" may be assigned to a compute node that corresponds with FSI links 2-8. In embodiments, the node identifiers may be maintained in a shared-access location that is accessible by one or more service processors. Other methods of establishing the plurality of node identifiers are also possible.

In embodiments, the plurality of node identifiers may be established for the plurality of compute nodes based on the set of cable-linkage topology data. As described herein, the set of cable-linkage topology data may include information indicating which field-replaceable service interface (FSI) links correspond to which compute nodes of the network environment (e.g., a node-number to FSI links map). For example, the cable-linkage topology data may include a mapping table that indicates that a first compute node corresponds to FSI links 2-8, and a second compute node corresponds to FSI links 9-15. In embodiments, the cable-linkage topology data may be maintained in a central topology database accessible to the control nodes (e.g., service processors) and compute nodes of the network environment. In embodiments, the cable-linkage topology data may be stored on a particular service processor or mapping engine of the control node. Based on the cable-linkage topology data, node identifiers may be assigned to one or more compute nodes of the plurality of compute nodes. For instance, as indicated by the cable-linkage topology data, the compute node that corresponds to FSI links 2-8 may be labeled as Node 1, and the compute node that corresponds to FSI links 9-15 may be labeled as Node 2 (e.g., if the link ranges corresponding to each node were reversed, so would the numbering). Other methods of establishing the plurality of node identifiers are also possible.

In embodiments, the plurality of node identifiers may be written to a set of persistent locations at block 242. Generally, writing can include saving, retaining, storing, recording, or maintaining the plurality of node identifiers in the set of persistent locations. The set of persistent locations can include volatile or non-volatile memory devices, storage devices (e.g., hard drives, solid state drives), databases, directories, or other organized repositories for data retention. In embodiments, the set of persistent locations may be located on the set of compute nodes. For instance, the set of persistent locations may include Vital Product Data (VPD) cards included in each compute node of the plurality of compute nodes. As an example, in embodiments, the first mapping engine may establish a node identifier of Node 1 for a compute node corresponding to FSI links 2-8 and a node identifier of Node 2 for a compute node corresponding to FSI links 9-15, and store the node identifier information on the VPD card of one or more compute nodes of the plurality of compute nodes. Other methods of writing the plurality of node identifiers to the set of persistent locations are also possible.

In embodiments, the set of persistent locations may be configured for access by a second mapping engine at block 244. Generally, configuring can include arranging, modifying, preparing, setting-up, instructing, or otherwise adapting the set of persistent locations for access by the second mapping engine. In embodiments, configuring can include modifying a set of access authorization policies that specify which components may perform read/write operations with respect to the set of persistent locations. For example, the access authorization policies of the set of persistent locations may be edited to specify that a second mapping engine (e.g., of a second service processor) is authorized to perform read operations with respect to the set of persistent locations. Accordingly, the second mapping engine may access one or more persistent locations of the set of persistent locations and retrieve (e.g., collect, acquire) the plurality of node identifiers (e.g., to facilitate dynamic node position assignment). Other methods of configuring the set of persistent locations for access by the second mapping engine are also possible.

At block 260, a first device path map may be determined. The first device path map may be determined based on the plurality of node identifiers and the set of cable-linkage topology data. Generally, determining can include formulating, generating, mapping, selecting, identifying, or otherwise ascertaining the first device path map. The first device path map can include a diagram, description, table, set of instructions, or other means of designating a network path for facilitating communication between one or more hardware devices (e.g., storage devices, memory devices) of the network environment and one or more compute nodes of the set of compute nodes. The first device path map may include a network path that specifies a starting point (e.g., port of a particular service processor), an ending point (e.g., port of a particular compute node), and the FSI links (e.g., corresponding to the hardware devices) for a particular connection between a service processor and a compute node. As described herein, determining the first device path map may be based on the plurality of node identifiers and the set of cable-linkage topology data. For instance, determining the first device path map may include analyzing the node identifier information and designating an origination port of the first service processor and a destination port of a compute node as the communication terminals for data traffic related to the corresponding set of FSI links. In embodiments, determining the first device path map may include mapping a first node identifier (e.g., Node 1) with a first set of cable-link identifiers (e.g., FSI links 2-8), and mapping a second node identifier (e.g., Node 2) with a second set of cable-link identifiers (e.g., FSI links 9-15). Other methods of determining the first device path map are also possible.

Consider the following example. The node identifier information established for the plurality of compute nodes may be retrieved from the set of persistent locations and analyzed. As described herein, in embodiments, the node identifier information may indicate that a node identifier of Node 1 has been assigned to the compute node corresponding to FSI links 2-8, and a node identifier of Node 2 has been assigned to the compute node corresponding to FSI links 9-15. In embodiments, the set of cable-linkage topology data may be analyzed to ascertain the available ports of the first service processor and the compute nodes (e.g., Node 1 and Node 2) that can serve as the origination and destination ports (e.g., starting and ending points) for data traffic between the first service processor and the compute nodes. For instance, the set of cable-linkage topology data may indicate which ports are occupied with other network traffic, which ports have sufficient bandwidth to support the designated FSI link ranges, and provide other information that impacts determination of the device path map. Based on the node identifiers, corresponding FSI link ranges, and the set of cable-linkage topology data, a first device path map may be determined to facilitate transmission of data traffic between the first service processor and the compute nodes. As an example, in embodiments, it may be determined that FSI links 2-8 can be transmitted along a network path starting at a Port 1 of the first service processor and ending at a Port 1 of Node 1, and that FSI links 9-15 can be transmitted along a network path starting at Port 2 of the first service processor and ending at Port 2 of Node 2. Other methods of determining the first device path map are also possible.

At block 280, a set of data traffic may be routed via the first connection between the first service processor and the plurality of compute nodes. The routing may be performed based on the first device path map. Generally, routing can include directing, sending, conducting, conveying, or otherwise transmitting the set of data traffic between the first service processor and the plurality of compute nodes. The set of data traffic can include data packets and other information related to one or more devices corresponding to an FSI link. For example, for an FSI link range that includes a memory device, the set of data traffic may include a command from a compute node indicating how much memory should be allocated for a particular computing task. In embodiments, routing may include transmitting data between a compute node of the plurality of compute nodes and a particular hardware device (e.g., included in the FSI link range for that compute node) based on the network path defined by the first device path map. As an example, for a first device path map that indicates a network path of Port 3 on the first service processor to Port 3 of Node 2 for an FSI link range of 9-15, a hardware device in the FSI link range may send a set of data traffic (e.g., task completion notification) to Node 2 via the connection between Port 3 of the first service processor and Port 3 of Node 2. Other methods of routing the set of data are also possible.

Consider the following example. The first mapping engine may monitor a central topology database and recognize a change to the physical and logical topology of the network environment that indicates a first connection between the first service processor and a plurality of compute nodes. Accordingly, the mapping engine may establish a plurality of node identifiers for the plurality of compute nodes based on the set of cable-linkage topology data. For instance, as described herein, in a situation in which the cable-linkage topology data indicates that a first node corresponds to FSI links 2-8 and a second node corresponds to FSI links 9-15, a node identifier of Node 1 may be assigned to the first node and a node identifier of Node 2 may be assigned to the second node (e.g., and written to a persistent location configured to be accessed by a second service processor). Based on the cable-linkage topology data and the node identifier information, a first device path map may be determined for managing communication between the plurality of compute nodes and the first service processor. For instance, the first device path map may indicate a network path including an origination port of Port 1 on the first service processor and a destination port of Port 1 on Node 1 for the FSI link range of 2-8, and an origination port of Port 2 on the first service processor and a destination port of Port 2 on Node 2 for the FSI link range 9-15. In embodiments, a software application operating on Node 2 may submit a set of traffic including a series of task instructions to a device corresponding to FSI link 13. Accordingly, as described herein, the set of data traffic may be routed from Port 2 on Node 2 to the hardware device on FSI link 13 via Port 2 of the first service processor. Other methods of establishing the plurality of node identifiers and routing the set of data traffic based on the first device path map are also possible.

In embodiments, aspects of the disclosure relate to automatically introducing a device path between one or more service processors and one or more compute nodes at block 294. Aspects of the disclosure relate to the recognition that, in embodiments, it may be desirable to maintain redundancy between service processors of a network environment in order to facilitate data traffic transmission and device management. Accordingly, aspects of the disclosure relate to dynamically establishing node identifiers for a plurality of compute nodes in response to sensing a connection between a first service processor and a plurality of compute nodes, and using the node identifiers to determine a first device path map to manage data traffic routing and transmission between the first service processor and the plurality of compute nodes. In embodiments, the node identifiers may be stored in a persistent location configured to be accessible to one or more other service processors (e.g., to enable redundancy). Other positive impacts of introducing the device path between one or more service processors and one or more compute nodes are also possible.

Method 200 concludes at block 299. Aspects of method 200 may provide performance or efficiency benefits for dynamic cable-linkage management for a shared pool of configurable computing resources having a set of cable-linkage topology data. For example, aspects of method 200 may have positive impacts with respect to facilitating network communication between a global service processor and a plurality of compute nodes using a device path map. As described herein, the sensing, establishing, determining, and routing described herein may each occur in an automated fashion without user intervention. Altogether, leveraging dynamic cable-linkage techniques may facilitate efficient management of service processors and other hardware components of multi-node server environments.

Figure 3:
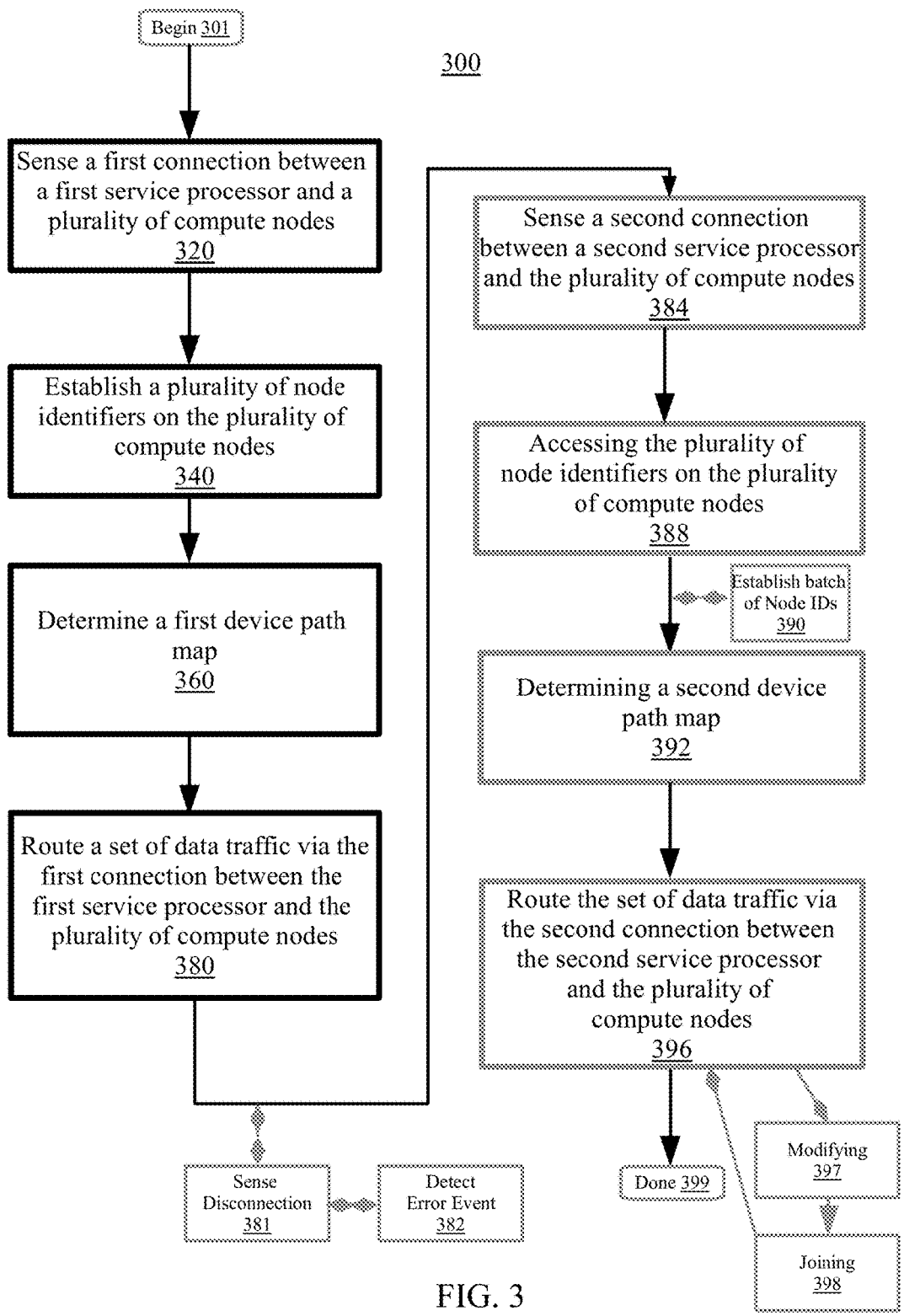
FIG. 3 is a flowchart illustrating a method for dynamic cable link management for a shared pool of configurable computing resources having a set of cable-linkage topology data, according to embodiments.

FIG. 3 is a flowchart illustrating a method 300 for dynamic cable link management for a shared pool of configurable computing resources having a set of cable-linkage topology data, according to embodiments. In embodiments, it may be desirable to maintain redundancy between service processors of a network environment in order to facilitate data traffic transmission and device management. Accordingly, aspects of method 300 relate to a second service processor utilizing a plurality of node identifiers to enable redundancy between the second service processor and the first service processor. In embodiments, aspects of the method 300 may substantially correspond to other embodiments described herein and the FIGS. 1-5. At block 320, a first connection between a first service processor and a plurality of compute nodes may be sensed. At block 340, a plurality of node identifiers may be established on the plurality of compute nodes. At block 360, a first device path map may be determined. At block 380, a set of data traffic may be routed between the first service processor and the plurality of compute nodes via the first connection based on the first device path map. The method 300 may begin at block 301.

In embodiments, a disconnection may be sensed between the first service processor and the plurality of compute nodes at block 381. The disconnection may include a detachment, separation, disruption, interruption, or other break in the link (e.g., traffic link, first connection) between the first service processor and the plurality of compute nodes. Generally, sensing can include recognizing, detecting, discovering, discerning, or otherwise identifying the disconnection between the first service processor and the plurality of compute nodes. In embodiments, sensing the disconnection can include detecting a cease in the network traffic between the first service processor and the plurality of compute nodes. For instance, a network traffic diagnostic tool may be configured to monitor the network traffic (e.g., rate of data packet flow, data transmission frequency) between the first service processor and the plurality of compute nodes, and detect that the data traffic rate has fallen below a threshold traffic level. In certain embodiments, sensing the disconnection may include accessing a central network node that maintains schematic layouts of the physical and logical topologies of the network environment, and ascertaining that a connection (e.g., the first connection) between the first service processor and the set of compute nodes has been interrupted. Other methods of sensing the disconnection between the first service processor and the plurality of compute nodes are also possible.

In embodiments, an error event may be detected with respect to the first service processor at block 382. Generally, detecting the error event can include recognizing, sensing, discovering, discerning, or otherwise identifying the error event with respect to the first service processor. The error event can include a software or hardware failure, bug, glitch, defect, irregularity, or other occurrence that impairs, prevents, limits, or otherwise impacts communication between the first service processor and one or more other components (e.g., compute nodes, hardware devices, other service processors) of the network environment. In embodiments, detecting the error event may include scanning the first connection between the first service processor and the plurality of compute nodes, and discovering that the link between the first service processor and one or more compute nodes of the plurality of compute nodes is inoperable or not functioning correctly, resulting in limited data transfer between the first service processor and the plurality of compute nodes. As another example, detecting the error event may include using a network traffic diagnostic tool to determine that the first service processor is unable to perform data input/output operations with respect to the one or more hardware devices corresponding to FSI links. Aspects of the disclosure relate to the recognition that, in response to detecting the error event, it may be necessary to perform a failover operation to configure a second service processor to perform the management operations of the first service processor in order to maintain continuous operation of the network environment. Accordingly, aspects of the disclosure relate to dynamic cable-linkage management to facilitate data redundancy between the first and second service processors. Other methods of detecting the error event with respect to the first service processor are also possible.

In embodiments, a second connection between the second service processor and the plurality of compute nodes may be sensed at block 384. The second connection may be sensed by a second mapping engine which is coupled with a second service processor on the set of control nodes. Generally, sensing can include recognizing, detecting, discovering, discerning, or otherwise identifying the second connection between the plurality of compute nodes and the second service processor. In embodiments, the second service processor may include a supplementary or backup service processor located on the set of control nodes. In certain embodiments, the set of control nodes may include a single control node that includes both the first and second service processors. The second connection may include a physical connection (e.g., hardwired cable connection) wireless connection (e.g., local wireless, Bluetooth, near-field communication) or other link for enabling communication and data transfer between the second service processor and the plurality of compute nodes. As described herein, sensing the second connection may include accessing a central network node that maintains schematic layouts of the physical and logical topologies of the network, and ascertaining that a connection exists between the second service processor and the set of compute nodes. Other methods of sensing the second connection are also possible.

In embodiments, the plurality of node identifiers on the plurality of compute nodes may be accessed by the second mapping engine at block 388. The second mapping engine may include a hardware component or software module configured to perform dynamic node position assignment for the compute nodes of a network as well as other tasks to facilitate operation of one or more service processors (e.g., node identifier access, data traffic routing, error event management). In embodiments, the second mapping engine and the first mapping engine may be the same mapping engine (e.g., a single software/hardware component communicatively connected to both the first and second service processors.) Generally, accessing can include collecting, retrieving, acquiring, reading, or obtaining the plurality of node identifiers from the plurality of compute nodes. In embodiments, accessing may include submitting an access request to one or more compute nodes of the plurality of compute nodes to be authorized for read/write permission with respect to the plurality of node identifiers. In response to the access request being granted, the second mapping engine may access the persistent location of a compute node to which the node identifier information has been saved (e.g., by the first mapping engine). As described herein, in embodiments, the plurality of node identifiers may be used by the second mapping engine to facilitate dynamic cable-linkage management and data communication between hardware devices of the network environment and the plurality of compute nodes. Other methods of accessing the plurality of node identifiers are also possible.

In embodiments, a batch of node identifiers may be established on the plurality of compute notes at block 390. The batch of node identifiers may be established by the second mapping engine. Generally, establishing can include assigning, labeling, providing, designating, or otherwise specifying the batch of node identifiers for the plurality of compute nodes. As described herein, the batch of node identifiers may include numbers, letters, symbols, or characters that indicate which service interface cables of the second service processor are connected to which compute node (e.g., cable 4 to port 3 of node 1), which FSI links correspond to which compute nodes (e.g., links 9-15 on node 2), and other data regarding the physical and logical topology of the connection between the first service processor and the plurality of compute nodes. In embodiments, the batch of node identifiers may be numbers assigned to the plurality of compute nodes that represent the configuration (e.g., physical and logical topology) of the network from the perspective of the second service processor. For instance, in embodiments in which one or more FSI service interface cables of the second service processor are connected in an arrangement different from that of the first service processor, the second mapping engine may establish the batch of node identifiers for the plurality of compute nodes based on the FSI link-compute node correspondence configuration of the second service processor. For instance, in a situation in which the service interface cable connections are reversed with respect to the first service processor, the second mapping engine may assign a node identifier of Node 2 to the compute node that corresponds with FSI links 2-8, and a node identifier of Node 1 to the compute node that corresponds with FSI links 9-15 (e.g., opposite of the node identifiers assigned by the first service processor). In embodiments, the batch of node identifiers may be stored or saved to the set of persistent locations (e.g., in a different Vital Product Data card than the plurality of node identifiers established by the first mapping engine). Other methods of establishing the batch of node identifiers on the plurality of compute nodes are also possible.

In embodiments, a second device path map may be determined at block 392. The second device path map may be determined based on the plurality of node identifiers and the set of cable linkage topology data. Generally, determining can include formulating, generating, selecting, identifying, or otherwise ascertaining the second device path map. As described herein, the second device path map can include a diagram, description, table, set of instructions, or other means of designating a network path for facilitating communication between one or more hardware devices (e.g., storage devices, memory devices) of the network environment and one or more compute nodes of the set of compute nodes. The second device path map may include a network path that specifies a starting point (e.g., port of a particular service processor), an ending point (e.g., port of a particular compute node), and the FSI links (e.g., corresponding to the hardware devices) for a particular connection between a service processor and a compute node. In embodiments, the second device path map may be determined based on the plurality of node identifiers established by the first mapping engine (e.g., and accessed by the second mapping engine). The second mapping engine may retrieve the plurality of node identifiers established by the first mapping engine, and formulate a second device path map that substantially corresponds to the first device path map (e.g., to transmit FSI link data traffic to their corresponding compute nodes). For instance, the second device path map may assign origination ports and destination ports for the second connection that correspond to the origination and destination ports of the first connection as indicated by the plurality of node identifiers (e.g., origination port of Port 1 on the first service processor and a destination port of Port 1 on Node 1 for the FSI link range of 2-8). Other methods of determining the second device path map are also possible.

Aspects of the disclosure relate to the recognition that, in certain situations, one or more service interface cables of the first or second connection may be mistakenly connected (e.g., connected to an incorrect port on a particular compute node, or connected to the wrong compute node). Accordingly, aspects of the disclosure relate to using the plurality of node identifiers to facilitate transmission of FSI link traffic to the plurality of compute nodes regardless of the cable topology of the network environment. In such a situation, a second device path may be determined for the second connection that provides for data transmission of the FSI links to their corresponding compute nodes. As an example, consider a situation in which the first service processor routes the FSI links 2-8 between port 1 of the first service processor and port 1 of Node 1, and routes FSI links 9-15 between port 2 of the first service processor and port 2 of Node 2. In the event that a service interface cable of the second service processor is incorrectly connected such that port 1 of the second service processor is connected to port 1 of Node 2 and port 2 is connected to port 2 of Node 1, the second mapping engine may use the plurality of node identifiers (e.g., established by the first mapping engine) to formulate a second device map that routes data traffic for FSI links 9-15 to Node 2 using port 1 of the second service processor and port 1 of Node 2, and FSI links 2-8 to Node 1 using port 2 of the second service processor and port 2 of Node 1 (e.g., the FSI links are delivered to the corresponding compute nodes.) Other methods of determining the second device path map are also possible.

In embodiments, the set of data traffic may be routed via the second connection between the second service processor and the plurality of compute nodes at block 396. The routing may be performed based on the second device path map. Generally, routing can include directing, sending, conducting, conveying, or otherwise transmitting the set of data traffic between the second service processor and the plurality of compute nodes. As described herein, the set of data traffic can include data packets and other information related to one or more devices corresponding to an FSI link. For example, for an FSI link range that includes a processing device, the set of data traffic may include a command from a compute node indicating how much computing resources should be allocated for a particular computing task. In embodiments, routing may include transmitting data between a compute node of the plurality of compute nodes and a particular hardware device (e.g., included in the FSI link range for that compute node) based on the network path defined by the second device path map. As an example, for a second device path map that indicates a network path of Port 4 on the second service processor to Port 4 of Node 2 for an FSI link range of 9-15, a hardware device in the FSI link range may send a set of data traffic (e.g., resource allocation notification) to Node 2 via the connection between Port 4 of the second service processor and Port 4 of Node 2. Other methods of routing the set of data are also possible.

In embodiments, the routing may be modified by dynamically switching from the first device path map to a second device path map at block 397. Generally, modifying can include altering, adjusting, revising, switching, adapting, revising, shifting, or otherwise changing from the first device path map to the second device path map. Aspects of the disclosure relate to the recognition that, in certain situations, the first service processor may become unavailable, unresponsive, or otherwise unusable (e.g., as the result of an error event). As described herein, in response to the first service process becoming unusable, a failover operation may be performed to configure a second service processor (e.g., located on the control node) to handle the tasks and operations of the first service processor. Accordingly, in such situations, it may be desirable to modify the network path of the set of data traffic by switching from the first device path map to the second device path map (e.g., to facilitate communication between the FSI links and the plurality of compute nodes using the second service processor). In embodiments, modifying the routing may include instructing the second service processor to transmit the set of data traffic according to the network path defined by the second device path map. In certain embodiments, modifying the routing may include reconfiguring the FSI links by unlinking particular devices from a particular connection (e.g., the first connection) and re-linking them to another connection (e.g., the second connection) so that FSI link access is routed through the network path to the corresponding compute node. Other methods of modifying the routing to dynamically (e.g., in real-time, on-the-fly) switch from the first device path map to the second device path map are also possible.

In embodiments, a plurality of columns of a mapping table having the set of cable-linkage topology data may be joined at block 398. The plurality of columns of the mapping table may be joined based on the plurality of node identifiers. Generally, joining can include combining, unifying, attaching, grouping, connecting, coupling, or otherwise merging the plurality of columns of the mapping table. As described herein, aspects of the disclosure relate to the recognition that, in certain situations, the FSI-link-compute node correspondence data may differ between the first service processor and the second service processor (e.g., as the result of a cable misconnection). Accordingly, aspects of the disclosure relate to joining one or more columns containing cable-linkage topology data for the first service processor with one or more columns containing cable-linkage topology data for the second service processor in order to associate the FSI links of the first device path map with the FSI links of the second device path map. As an example, consider that the FSI links mapping table of the first service processor assigns FSI link range 2-8 to Node 1 and FSI link range 9-15 to Node 2, and the FSI links mapping table of the second service processor assigns FSI link range 2-8 to Node 2 and FSI link range 9-15 to Node 1. Accordingly, the mapping tables of each respective service processor may be combined to indicate that the FSI link range 2-8 of the first device path map corresponds to FSI link range 9-15 of the second device path map, and FSI link range 9-15 of the first device path map corresponds to FSI link range 2-8 of the second device path map. Other methods of joining the plurality of columns of the mapping table to associate the FSI links of the first device path map with the FSI links of the second device path map are also possible.

Consider the following example. A network environment may include a single control node having a first service processor, a second service processor, and two compute nodes (e.g., Node A and Node B). The first service processor may have FSI links 2-8 connected to Node A and FSI links 9-15 connected to Node B. As the result of a mistaken cable connection, the connections of the second service processor may be reversed such that FSI links 2-8 are connected to Node B and FSI links 9-15 are connected to Node A. As described herein, aspects of the disclosure relate to the recognition that, without dynamic node positioning techniques, the FSI links on the second service processor may be considered invalid (e.g., resulting in the second service processor not being able to access either of the two compute nodes, and limiting data redundancy). Accordingly, aspects of the disclosure relate to assigning node identifiers (e.g., numbers) to the compute nodes based on the set of cable-linkage topology data. For instance, the first mapping engine may assign a number of "1" to Node A and a number of "2" to Node B. The node identifiers assigned by the first mapping engine may be written to a persistent location (e.g., VPD chip of the plurality of compute nodes).

In the event of a failover operation (e.g., the first service processor encountered an error event), the second service processor may access the persistent location and read the node identifiers to establish its own mapping configuration for the FSI links and the compute nodes. As described herein, due to the mistaken cable connection of the second service processor, the FSI link-compute node mapping for the second service processor may be reversed with respect to the mapping of the first service processor. For instance, the FSI link range 2-8 may correspond to Node 2, and FSI link range 9-15 may correspond to Node 1. Based on the node identifier information read from the persistent location, the second service provider may switch around the device paths such that device paths on FSI links 2-8 are routed via the connection for links 9-15, and the device paths on links 9-15 are routed via the connection for links 2-8 (e.g., an "effective" device path for FSI links 9-15 may correspond to an "actual device path" of FSI links 2-8 and vice-versa). As described herein, the device paths may be switched dynamically to facilitate data traffic communication between the device links, control node, and plurality of compute nodes.

Method 300 concludes at block 399. Aspects of method 300 may provide performance or efficiency benefits for dynamic cable-linkage management for a shared pool of configurable computing resources having a set of cable-linkage topology data. For example, aspects of method 300 may have positive impacts with respect to facilitating redundancy between a first service processor and a second service processor using dynamic node position assignment. As described herein, the sensing, establishing, determining, and routing described herein may each occur in an automated fashion without user intervention. In embodiments, the control node may be configured to detect a system reset operation and repeat the sensing, establishing, determining, routing, and other steps described herein in order to verify the plurality of node identifiers (e.g., so the node numbers will remain valid after a system reset). Altogether, leveraging dynamic cable-linkage techniques may facilitate efficient management of service processors and other hardware components of multi-node server environments.

Figure 4:
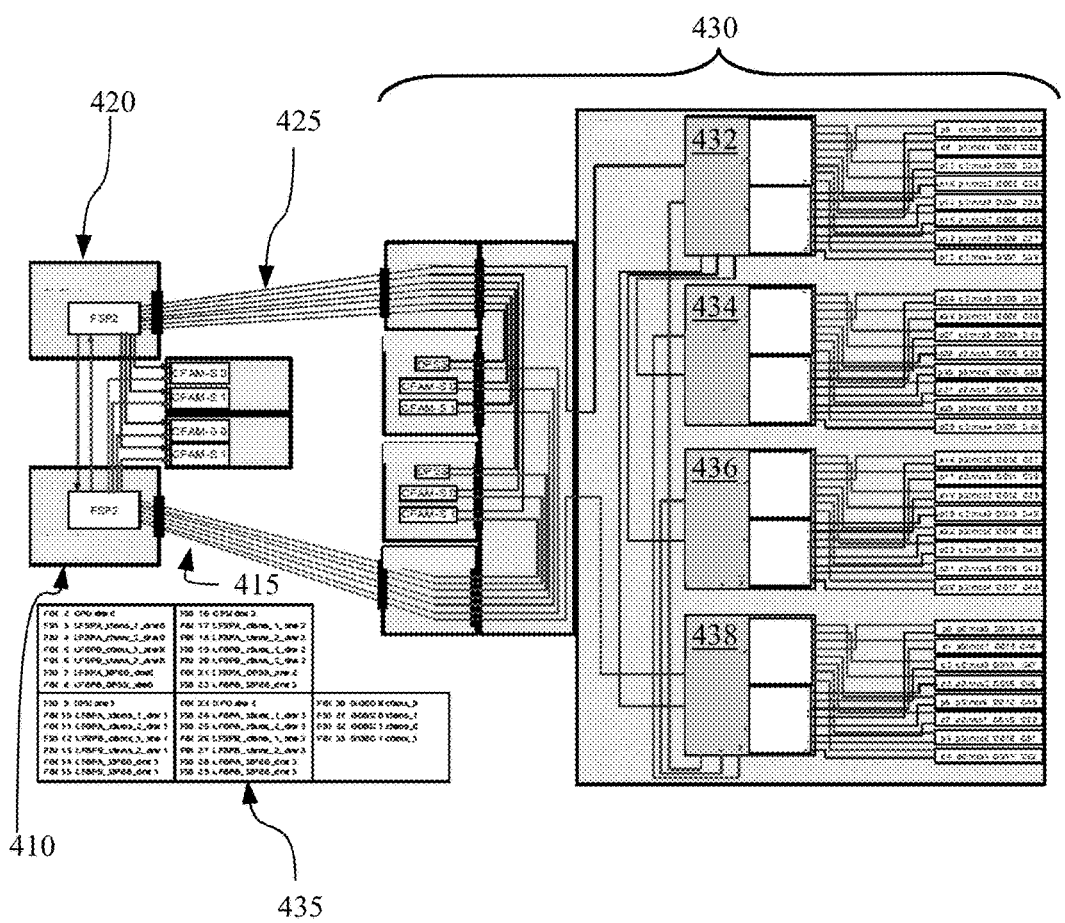
FIG. 4 illustrates an example system infrastructure for dynamic cable link management, according to embodiments.

FIG. 4 illustrates an example system infrastructure 400 for dynamic cable link management, according to embodiments. Aspects of the system infrastructure 400 relate to a network environment configured to facilitate redundancy between service processors using dynamic cable-linkage management techniques. Accordingly, as described herein, the system infrastructure 400 may include a first service processor 410 and a second service processor 420. The first service processor 410 and the second service processor 420 may include specialized processors configured to monitor the operational status of a set of hardware devices using sensors, and provide remote management capabilities including console redirection, logging, and power control. In embodiments, the first service processor 410 may be communicatively connected to a plurality of compute nodes 430 via a first connection 415, and the second service processor 420 may be communicatively connected to the plurality of compute nodes 430 via a second connection 425. The first and second connections 415, 425 may facilitate network communication and data transfer (e.g., of a set of data traffic including FSI links) between the first and second service processors 410,420 and the plurality of compute nodes 430, respectively. In embodiments, the first and second service processors 410, 420 may be associated with a set of cable-linkage topology data 435 that specifies the FSI links that correspond to particular compute nodes. As examples, the cable-linkage topology data 435 may indicate that FSI links 2-8 correspond to a first compute node 432, FSI links 9-15 correspond to a second compute node 434, FSI links 16-22 correspond to a third compute node 436, and FSI links 23-29 correspond to a fourth compute node 438. Other methods of structuring the system infrastructure 400 are also possible.

In embodiments, as described herein, the system infrastructure 400 may facilitate redundancy between service processors using dynamic cable-linkage management techniques. In embodiments, the plurality of compute nodes 430 may include a first compute node (e.g., 432) and a second compute node (e.g., 434). The plurality of node identifiers may include a first node identifier (e.g., Node 1) and a second node identifier (e.g., Node 2). As described herein, the first mapping engine may establish the first node identifier on the first compute node (e.g., Node 1 for compute node 432) and the second identifier on the second compute node (e.g., Node 2 for compute node 434). In embodiments, the set of cable-linkage topology data may include a first set of cable-link identifiers (e.g., a first set of FSI links; 2-8) for the first compute node and a second set of cable-link identifiers (e.g., a second set of FSI links; 9-15) for the second compute node. Determining the first device path map may include mapping the first node identifier with the first set of cable-link identifiers (e.g., Node 1 mapped to FSI links 2-8) and mapping the second node identifier with the second set of cable-link identifiers (e.g., Node 2 mapped to FSI links 9-15). Based on the first device path map, the set of data may be routed between the first service processor and the plurality of compute nodes via the first connection. In embodiments, the first set of cable-link identifiers may be used to route a first subset of the set of data traffic between the first service processor and the first compute node (e.g., set of resource allocation instructions to Node 1 using FSI links 2-8), and the second set of cable-link identifiers may be used to route a second subset of the set of data traffic between the second service processor and the second compute node (e.g., set of task scheduling instructions to Node 2 using FSI links 9-15). Other methods of dynamic cable-link management are also possible.

Figure 5:
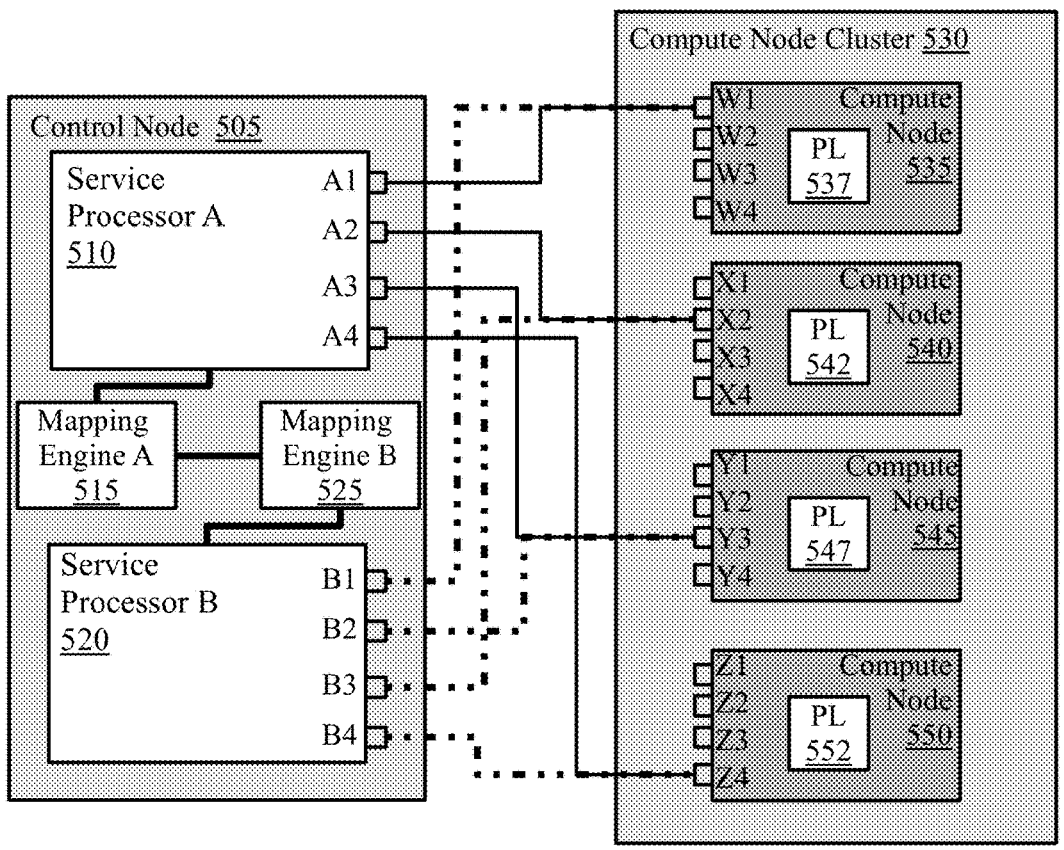
FIG. 5 illustrates an example system infrastructure for dynamic cable link management, according to embodiments.

FIG. 5 illustrates an example system infrastructure 500 for dynamic cable link management, according to embodiments. Aspects of the system infrastructure 500 relate to a network environment configured to facilitate redundancy between service processors using dynamic cable-linkage management techniques. In embodiments, the system infrastructure 500 may include a control node 505 having a Service Processor A 510 and a Service Processor B 520. Service Processor A 510 may be communicatively connected to a Mapping Engine A 515 and Service Processor B 520 may be communicatively connected to a Mapping Engine B 525. As shown in FIG. 5, Service Processor A 510 and Service Processor B 520 may each include a plurality of ports (e.g., A1, A2, A3, A4 and B1, B2, B3, B4, respectively) for enabling transmission of data traffic with one or more compute nodes of a compute node cluster 530. The compute node cluster 530 may include a compute node 535, a compute node 540, a compute node 545, and a compute node 550. In embodiments, each compute node of the compute node cluster may include a persistent location (PL). For instance, as shown in FIG. 5, compute node 535 may include a persistent location 537, compute node 540 may include a persistent location 542, compute node 545 may include a persistent location 547, and compute node 550 may include a persistent location 552. As described herein, the persistent locations may be configured to store information pertaining to a plurality of node identifiers for the compute nodes. A first device path map 560 and a second device path map 570 may be determined based on the node identifier information stored in the persistent locations. Other methods of structuring the system infrastructure 500 are also possible.

In embodiments, as described herein, aspects of the disclosure relate to the Mapping Engine A 515 writing a plurality of node identifiers (e.g., Node 1, Node 2) to the persistent locations of the compute nodes. The persistent locations may be configured for access by the second mapping engine. In certain embodiments, in response to detecting an error event (e.g., bug, glitch, software/hardware failure, irregularity) with respect to the service processor, the Mapping Engine B 525 may be configured to access the set of persistent locations. In embodiments, the Mapping Engine B 525 may be configured to access the set of persistent locations to retrieve the node identifier information saved there by the Mapping Engine A 515 (e.g., for use in determining a second device path map). Accordingly, the node identifier information may be accessible by the second mapping engine whether or not Service Processor A 510 is present. Other methods of managing the node identifier information and the persistent regions are also possible.

In embodiments, a second service processor (e.g., service processor B 520) may be coupled with a second mapping engine (e.g., mapping engine B 525) on the set of control nodes (e.g., control node 505). The second mapping engine may sense a second connection (e.g., connections to one or more of ports B1, B2, B3, or B4) between the second service processor and the plurality of compute nodes (e.g., compute node cluster 530). The second mapping engine may access a first node identifier (e.g., Node 1) on the first compute node (e.g., compute node 535) and a second node identifier (e.g., Node 2) on the second compute node (e.g., compute node 540). Based on the plurality of node identifiers and the set of cable-linkage topology data, a second device path map may be determined by mapping the first node identifier (e.g., Node 1) with the second set of cable-link identifiers (e.g., FSI links 9-15) and the second node identifier (e.g., Node 2) with the first set of cable-link identifiers (e.g., FSI links 2-8). Based on the second device path map, a set of data traffic may be routed between the second service processer and the plurality of compute nodes via the second connection. In embodiments, a first subset of the set of data traffic (e.g., set of resource allocation instructions) may be routed between the second service processor (e.g., Service Processor B 520) and the first compute node (e.g., compute node 535) using the second set of cable-link identifiers (e.g., FSI links 9-15), and a second subset of data traffic (e.g., set of task scheduling instructions) may be routed between the second service processor (e.g., Service Processor B 520) and the second compute node (e.g., compute node 540) using the first set of cable-link identifiers (e.g., FSI links 2-8). Other methods of dynamic cable-linkage management are also possible.

Aspects of the disclosure relate to the recognition that, in certain situations, one or more service interface cables of the Service Processor A 510 or the Service Processor B 520 may be mistakenly connected (e.g., connected to an incorrect port on a particular compute node, or connected to the wrong compute node). Accordingly, aspects of the disclosure relate to using the plurality of node identifiers to facilitate transmission of FSI link traffic to the plurality of compute nodes regardless of the cable topology of the network environment. Consider, for example, that the Service Processor A 510 is connected to the compute nodes of the compute node cluster 530 as shown in FIG. 5, such that port A1 is connected to port W1 of compute node 535, port A2 is connected to port X2 of compute node 540, port A3 is connected to port Y3 of compute node 545, and port A4 is connected to port Z4 of compute node 550. In order to facilitate redundancy between the two service processors, it may be desirable to connect Service Processor B 520 to the compute nodes of the compute node cluster 530 such that the connections substantially correspond to the connections of Service Processor A (e.g., port B1 to port W1 of compute node 535, port B4 to port Z4 of compute node 550). However, as the result of a mistaken connection, Service Processor B 520 may have a cable switched with respect to Service Processor A 510, such that port B2 is connected to port Y3 of compute node 545 (e.g., instead of port X2 of compute node 540) and port B3 is connected to port X2 of compute node 540 (e.g., instead of port Y3 of compute node 545.)

Accordingly, aspects of the disclosure relate to establishing node identifiers for the set of compute nodes of the compute node cluster 530 to facilitate transmission of FSI link data traffic to the corresponding (e.g., correct) compute node (e.g., regardless of the service interface plugging configuration). As described herein, the Mapping Engine A 515 may establish a plurality of node identifiers for the plurality of compute nodes based on a set of cable-linkage topology data that specifies the corresponding FSI link ranges for each compute node. For instance, the Mapping Engine A 515 may assign a node identifier of Node 1 to compute node 535, a node identifier of Node 2 to compute node 540, a node identifier of Node 3 to compute node 545, and a node identifier of Node 4 to compute node 550. Based on the plurality of node identifiers, the Mapping Engine A 515 may determine a first device path map 560 that designates the node identifier, network path (e.g., port connections), and device path (e.g., FSI link range) for each compute node.

Aspects of the disclosure relate to the recognition that, in certain situations, Service Processor A 510 may become unavailable, unresponsive, or otherwise unusable, resulting in a failover operation to Service Processor B 520. As described herein, in such a situation, the Mapping Engine B 525 may be configured to access the persistent location (e.g., persistent location 537, 542, 547, or 552) in order to retrieve the plurality of node identifiers. Using the plurality of node identifiers, the Mapping Engine B 525 may be configured to establish a second device path map 570. By making use of the plurality of node identifiers and corresponding FSI links, Service Processor B 520 may facilitate transmission of FSI link data traffic to the corresponding compute node (e.g., regardless of the mistaken connection). Other methods of dynamic cable-linkage management are also possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method of dynamic cable-linkage management for a shared pool of configurable computing resources having a set of cable-linkage topology data, the method comprising:
   sensing, by a first mapping engine which is coupled with a first service processor on a set of control nodes, a first connection between the first service processor and a plurality of compute nodes;
   establishing, by the first mapping engine, a first node identifier on a first compute node;
   establishing, by the first mapping engine, a second node identifier on a second compute node, wherein the set of cable-linkage topology data includes a first set of cable-link identifiers for the first compute node and a second set of cable-link identifiers for the second compute node;
   determining, based on the plurality of node identifiers and the set of cable-linkage topology data, a first device path map includes:
      mapping the first node identifier with the first set of cable-link identifiers, and
      mapping the second node identifier with the second set of cable-link identifiers:
   routing, using the first set of cable-link identifiers, a first subset of the set of data traffic between the first service processor and the first compute node;
   routing, using the second set of cable-link identifiers, a second subset of the set of data traffic between the first service processor and the second compute node;
   coupling, on the set of control nodes, a second service processor with a second mapping engine;
   sensing, by the second mapping engine, a second connection between the second service processor and the plurality of compute nodes;
   accessing, by the second mapping engine, the first node identifier on the first compute node and the second node identifier on the second compute node;
   determining, based on the plurality of node identifiers and the set of cable-linkage topology data, a second device path map including:
      mapping the first node identifier with the second set of cable-link identifiers, and
      mapping the second node identifier with the first set of cable-link identifiers;
   routing, using the second set of cable-link identifiers, the first subset of the set of data traffic between the second service processor and the first compute node; and
   routing, using the first set of cable-link identifiers, the second subset of the set of data traffic between the second service processor and the second compute node.

2. The method of claim 1, further comprising:
   sensing, by a second mapping engine which is coupled with a second service processor on the set of control nodes, a second connection between the second service processor and the plurality of compute nodes;
   accessing, by the second mapping engine, the plurality of node identifiers on the plurality of compute nodes;
   determining, based on the plurality of node identifiers and the set of cable-linkage topology data, a second device path map; and routing, based on the second device path map, the set of data traffic via the second connection between the second service processor and the plurality of compute nodes.

3. The method of claim 2, further comprising:
sensing a disconnection between the first service processor and the plurality of compute nodes.

4. The method of claim 3, further comprising:
detecting, with respect to the first service processor, an error event.

5. The method of claim 2, wherein the set of control nodes is a single control node.

6. The method of claim 5, wherein the first and second mapping engines are a same mapping engine.

7. The method of claim 2, further comprising:
establishing, by the second mapping engine, a batch of node identifiers on the plurality of compute nodes.

8. The method of claim 1, wherein establishing, by the first mapping engine, the plurality of node identifiers on the plurality of compute nodes includes:
writing the plurality of node identifiers to a set of persistent locations; and
configuring the set of persistent locations for access by the second mapping engine.

9. The method of claim 8, further comprising:
detecting, with respect to the first service processor, an error event; and
accessing, by the second mapping engine, the set of persistent locations.

10. The method of claim 1, further comprising:
modifying the routing by dynamically switching from the first device path map to a second device path map.

11. The method of claim 10, further comprising:
joining, based on the plurality of node identifiers, a plurality of columns of a mapping table having the set of cable-linkage topology data.

12. The method of claim 1, further comprising: unlinking, by the first mapping engine, a first device link from the first connection; linking, by the second mapping engine, the first device link to the second connection; and modifying, in response to linking the first device link to the second connection, the first device path map and the second device path map.

13. The method of claim 1, further comprising:
detecting, by the first mapping engine, a system reset operation with respect to the first service processor; and
evaluating, in response to detecting the system reset operation, the plurality of node identifiers.

14. The method of claim 1, wherein dynamic cable-linkage management automatically introduces a device path between one or more service processors and one or more compute nodes.

15. The method of claim 1, wherein the sensing, the establishing, the determining, and the routing each occur in an automated fashion without user intervention.

16. A system for dynamic cable-linkage management for a shared pool of configurable computing resources having a set of cable-linkage topology data, the system comprising:
a memory having a set of computer readable computer instructions, and
a processor for executing the set of computer readable instructions, the set of computer readable instructions including:
sensing, by a first mapping engine which is coupled with a first service processor on a set of control nodes, a first connection between the first service processor and a plurality of compute nodes;
establishing, by the first mapping engine, a first node identifier on a first compute node;
establishing, by the first mapping engine, a second node identifier on a second compute node, wherein the set of cable-linkage topology data includes a first set of cable-link identifiers for the first compute node and a second set of cable-link identifiers for the second compute node;
determining, based on the plurality of node identifiers and the set of cable-linkage topology data, a first device path map includes:
mapping the first node identifier with the first set of cable-link identifiers, and
mapping the second node identifier with the second set of cable-link identifiers;
routing, using the first set of cable-link identifiers, a first subset of the set of data traffic between the first service processor and the first compute node;
routing, using the second set of cable-link identifiers, a second subset of the set of data traffic between the first service processor and the second compute node;
coupling, on the set of control nodes, a second service processor with a second mapping engine;
sensing, by the second mapping engine, a second connection between the second service processor and the plurality of compute nodes;
accessing, by the second mapping engine, the first node identifier on the first compute node and the second node identifier on the second compute node;
determining, based on the plurality of node identifiers and the set of cable-linkage topology data, a second device path map including:
mapping the first node identifier with the second set of cable-link identifiers, and
mapping the second node identifier with the first set of cable-link identifiers;
routing, using the second set of cable-link identifiers, the first subset of the set of data traffic between the second service processor and the first compute node; and
routing, using the first set of cable-link identifiers, the second subset of the set of data traffic between the second service processor and the second compute node.

17. A computer program product for dynamic cable-linkage management for a shared pool of configurable computing resources having a set of cable-linkage topology data, the computer program product comprising a computer readable storage medium having program instructions embodied therewith, wherein the computer readable storage medium is not a transitory signal per se, the program instructions executable by a processor to cause the processor to perform a method comprising:
sensing, by a first mapping engine which is coupled with a first service processor on a set of control nodes, a first connection between the first service processor and a plurality of compute nodes;
establishing, by the first mapping engine, a first node identifier on a first compute node;
establishing, by the first mapping engine, a second node identifier on a second compute node, wherein the set of cable-linkage topology data includes a first set of cable-link identifiers for the first compute node and a second set of cable-link identifiers for the second compute node;
determining, based on the plurality of node identifiers and the set of cable-linkage topology data, a first device path map includes:

mapping the first node identifier with the first set of cable-link identifiers, and mapping the second node identifier with the second set of cable-link identifiers;

routing, using the first set of cable-link identifiers, a first subset of the set of data traffic between the first service processor and the first compute node;

routing, using the second set of cable-link identifiers, a second subset of the set of data traffic between the first service processor and the second compute node;

coupling, on the set of control nodes, a second service processor with a second mapping engine;

sensing, by the second mapping engine, a second connection between the second service processor and the plurality of compute nodes;

accessing, by the second mapping engine, the first node identifier on the first compute node and the second node identifier on the second compute node;

determining, based on the plurality of node identifiers and the set of cable-linkage topology data, a second device path map including:

mapping the first node identifier with the second set of cable-link identifiers, and mapping the second node identifier with the first set of cable-link identifiers;

routing, using the second set of cable-link identifiers, the first subset of the set of data traffic between the second service processor and the first compute node; and routing, using the first set of cable-link identifiers, the second subset of the set of data traffic between the second service processor and the second compute node.

* * * * *